United States Patent [19]
Hirakawa et al.

[11] Patent Number: 6,035,338
[45] Date of Patent: Mar. 7, 2000

[54] DOCUMENT BROWSE SUPPORT SYSTEM AND DOCUMENT PROCESSING SYSTEM

[75] Inventors: Hideki Hirakawa; Kazuhiro Kimura, both of Yokohama, Japan

[73] Assignee: Kabushiki Kaisha Toshiba, Kawasaki, Japan

[21] Appl. No.: 08/933,137

[22] Filed: Sep. 18, 1997

[30] Foreign Application Priority Data

Sep. 19, 1996 [JP] Japan ................................ 8-247799

[51] Int. Cl.[7] .................................................. G06F 15/16
[52] U.S. Cl. ........................ 709/243; 709/238; 707/3; 707/4; 707/5; 707/6
[58] Field of Search ................................. 709/238, 243; 707/3, 4, 5, 6

[56] References Cited

U.S. PATENT DOCUMENTS

| | | | |
|---|---|---|---|
| 5,694,594 | 12/1997 | Chang | 395/606 |
| 5,761,662 | 6/1998 | Dasan | 707/10 |
| 5,764,906 | 6/1998 | Edelstein et al. | 395/200.49 |
| 5,822,539 | 10/1998 | Van Hoff | 395/200.66 |
| 5,848,407 | 12/1998 | Ishikawa et al. | 707/2 |

Primary Examiner—Frank J. Asta
Assistant Examiner—Stephan F. Willett
Attorney, Agent, or Firm—Oblon, Spivak, McClelland, Maier & Neustadt, P.C.

[57] ABSTRACT

An expression pattern in a document and the data describing related information associated with the output information to obtain the output information corresponding to the expression pattern are inputted. An expression pattern in a document on a computer network is sensed by reference to the expression pattern in the data. The output information corresponding to the sensed expression pattern is created from a document on the computer network on the basis of the related information in the inputted data.

5 Claims, 10 Drawing Sheets

```
<TEXT:

<HD1: Today's News>
<ITM1:
   <ITM:HUL acquired Ratos yesterday.>
   <ITM:Tasuba developped new software.>
     .
     .
 >
 <HD1:why don't you try new products!>
 <ITM1
   <ITM:Movie Search><OBJ:spaker1><OBJ:person1>
   <ITM:Kid's park><OBJ:spaker2><OBJ:person2>
 >
>
```

FIG. 7

```
1 why     (WH, HeadCap)  45-47
2 do      (AUX)          49-*
3 not     (NOT)          *-53
4 you     (PRO)          55-57
5 try     (VT)           59-61
6 new     (ADJ)          63-65
7 product (NOUN,pl)      67-73
```

FIG. 8

```
acquire ─┬─── <agent> ───── HUL  (*ComputerCompany)
         ├─── <target> ──── Ratos (*ComputerSoftwareCompany)
         └─── <time> ────── yesterday
```

| COMPANY ACQUISITION BY COMPUTER COMPANY | | | | TOM HARKINGS | | |
|---|---|---|---|---|---|---|
| PA1 | Bigsoft | acquire | Intra | 1995.03 | PA23 | buy | new house |
| PA5 | Tasuba | buy | XYZ | 1995.01 | | visit | Japan |
| | | | | | | visit | China |
F I G. 1 3
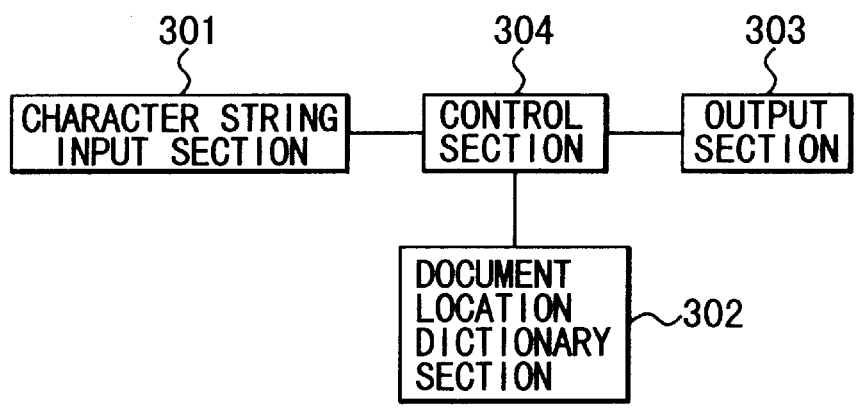
F I G. 1 4

| HEADLINE | LOCATION | REFE-RENCE | UPDATE TIME | FREQUENCY OF UPDATE |
|---|---|---|---|---|
| ABC : | http://www.abc/com/ | 456 | 5/20/96 | 0.6 |
| | http://www.abc/com/intro | 30 | 4/20/96 | 0.1 |
| | http://www.toycomany.com/prd/abc.html | 2 | 6/13/95 | 0.001 |
| ABCD : | http://www./abcd.com/ | 23 | 3/23/96 | 0.8 |
| Tasuba : | http://www.tasuba.co.jp/welcome.html | 4000 | 5/28/96 | 2.2 |
| | http://www.tosuba.co.jp/ | 20 | 5/23/96 | 1.2 |
| | http://www.abc.com/information/ts.html | 2 | 4/12/95 | 0.003 |

F I G. 1 5

```
┌─────────────────────────────────┐
│ TAKE OUT CHARACTER STRING FROM  │~S11
│ CHARACTER STRING INPUT SECTION  │
└─────────────────────────────────┘
                │
                ▼
┌─────────────────────────────────┐
│ RETRIEVE NETWORK DOCUMENT LOCATION│
│ DICTIONARY FOR INPUT CHARACTER  │~S12
│ STRING                          │
└─────────────────────────────────┘
                │
                ▼
┌─────────────────────────────────┐
│ OUTPUT THE CONTENTS OF THE      │
│ DICTIONARY TO OUTPUT SECTION IF │
│ HEADLINE MATCHED WITH THE INPUT │
│ CHARACTER STRING. IF SUCH A HEAD│~S13
│ LINE DOES NOT EXIST, OUTPUT THE │
│ INFORMATION TO THAT EFFECT.     │
└─────────────────────────────────┘
```

F I G. 1 6

```
3/3 Tasuba
  4000 5/28/96 2.2    http://www.tosuba.co.jp
                      /welcome.html
    20 5/23/96 1.2    http://www.tosuba.co.jp/
     2 4/12/95 0.003  http://www.abc.com
                      /information/ts.html
```

F I G. 1 7

```
3/3 Tasuba
     2 4/12/95 0.003  http://www.abc.com
                      /information/ts.html
  4000 5/28/96 2.2    http://www.tosuba.co.jp
                      /welcome.html
    20 5/23/96 1.2    http://www.tosuba.co.jp/
```

F I G. 1 8

DOCUMENT BROWSE SUPPORT SYSTEM AND DOCUMENT PROCESSING SYSTEM

BACKGROUND OF THE INVENTION

This invention relates to a document browse support system and a document processing system best suitable for the system.

With the spread of the Internet, document browsing systems that enable the users to browse through documents on the computer network, or document browsers, have been widely used. To use such document browsers, related information about pieces of information, such as words and phrases appearing on a document on the computer network, are linked to other documents on the computer network. This enables the users to browse through other documents with a simple operation, such as clicking the mouse button. Such links, however, are prepared beforehand by the persons who have created the documents to be browsed, so the information the reader reading the document wants is not always prepared.

As described above, with conventional document browse systems, related information has been caused to correspond to only the pieces of information, such as words and phrases, prepared by the document creators. This causes the problem that people other than the document creators cannot give the related information created by the former to the documents to be browsed.

BRIEF SUMMARY OF THE INVENTION

Accordingly, the object of the present invention is to provide a document browse support system that realizes an environment where the related information created by people other than the document creators can be given to documents to be browsed on the computer network.

The foregoing object is accomplished by providing a document browse support system for application in a document browsing system for browsing through documents on a computer network, the document browse support system using a data describing at least one expression pattern in a document and information associated with output information which is to be obtained and which corresponds to the expression pattern, the support system comprising:

sensing means for sensing an expression pattern in a document on the computer network by reference to the expression pattern in the data; and output means for outputting the output information corresponding to the expression pattern sensed by the sensing means from a document on the computer network on the basis of the information in the data.

With the present invention, the above configuration enables a user other than the document creator to give information to a document to be browsed in browsing through documents on the computer network.

Furthermore, the foregoing object is accomplished by providing a document browse support system for application in a document browsing system for browsing through documents on a computer network, the document browse support system comprising:

input means for inputting the data that describes at least an expression pattern in a document and the document location information indicating the location of the document including the expression pattern on the computer network in such a manner that the expression pattern corresponds to the document location information;

sensing means for sensing an expression pattern in a document on the computer network by reference to the expression pattern in the data inputted by the input means;

retrieving means for retrieving the document location information corresponding to the expression pattern sensed by the sensing means from the data inputted by the input means; and output means for outputting the document location information retrieved by the retrieving means.

With this configuration, even when there is no hyperlink, document location information, in a document to be browsed on the computer network, it is possible to cause a hyperlink to correspond to the document and output the document location information.

Furthermore, the foregoing object is accomplished by providing a document processing system for processing a document to be browsed after retrieval on the basis of the document location information indicating a location on a computer network, the document processing system comprising:

information storage means in which a character string and document location information on a document including the character string are stored in such a manner that the character string corresponds to the document location information;

input means for inputting a character string;

retrieving means for retrieving specific document location information from the information storage means on the basis of the character string inputted from the input means; and output means for outputting the document location information retrieved by the retrieving means.

With such a configuration, when a document including a hyperlink is created, it is possible to retrieve the hyperlink information that another person has created in the document as document location information, display the retrieved information, and use it.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 shows part of the document data transmitted in the first embodiment;

FIG. 8 shows the information obtained for the word standard form in the first embodiment;

FIG. 13 shows an example of the stored information in the first embodiment;

FIG. 14 is a schematic block diagram of a document processing system according to a second embodiment of the present invention;

FIG. 15 shows an example of document location information in the second embodiment;

FIG. 16 is a flowchart for the operation of the control section in the second embodiment;

FIG. 17 shows an example of the presentation of information in the second embodiment; and FIG. 18 shows an example of the stored information in the second embodiment.

DETAILED DESCRIPTION OF THE INVENTION

Hereinafter, referring to the accompanying drawings, embodiments of the present invention will be explained.
(First Embodiment)

A first embodiment of the present invention relates to a document browse support system that helps brows through documents on the computer network. While performing a specific output process for the desired expression pattern appearing in a document, for instance, when the user is browsing a WEB page, the system realizes the display of learning data for specific language expression (e.g., English) on the page and the storing of the learning data. This enables the user to learn the language or acquire pieces of information, while looking at the desired pieces of information.

Figure 1:
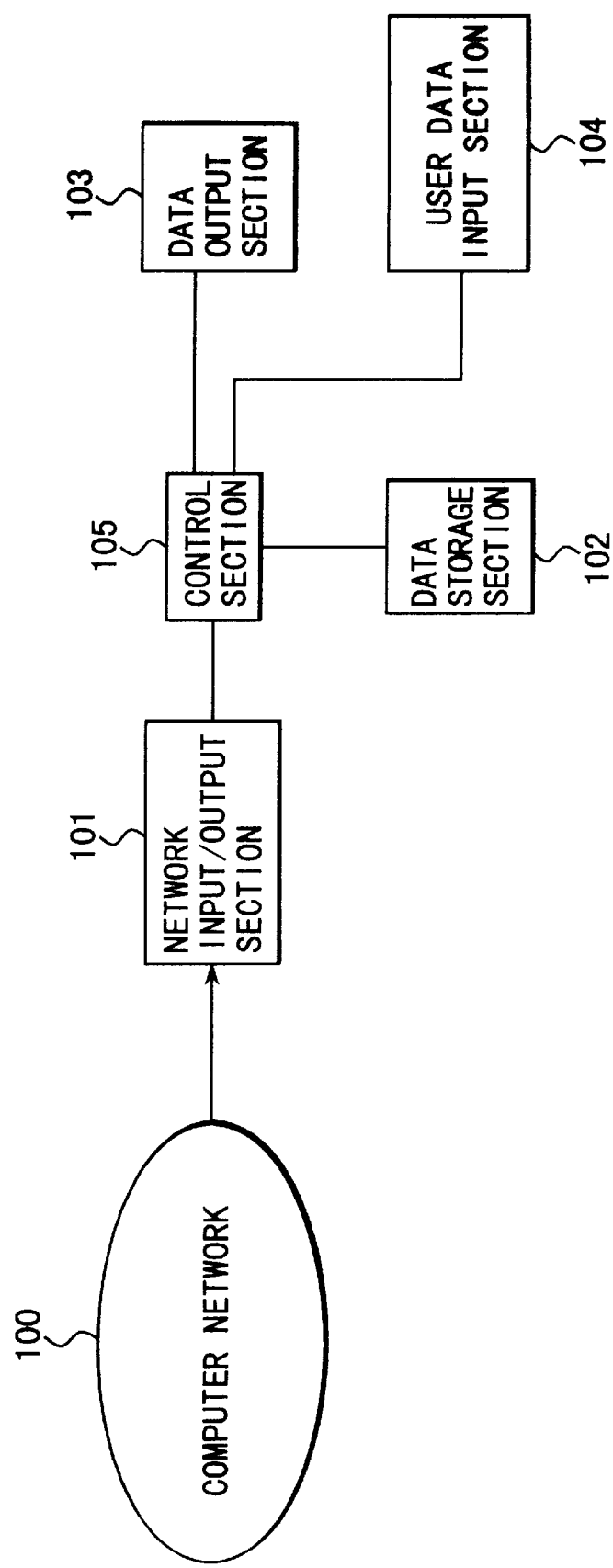
FIG. 1 is a schematic block diagram of a document browse support system according to a first embodiment of the present invention.

FIG. 1 is a block diagram of a document browse support system according to a first embodiment of the present invention. The document browse support system comprises a network input/output section 101 with the function of retrieving data from a computer network 100 and transmitting data to the computer network 100, a data storage section 102 with the function of storing various data items, a data output section 103 that includes display means, such as a CRT display or a liquid-crystal display, and has the function of presenting various pieces of information to the user, a user data input section 104, such as a keyboard, a pen input device, a storage medium (e.g., a floppy disk), or a computer, that allows the user to enter the desired data, and a control section 105 that controls these network input/output section 101, data storage section 102, data output section 103, and user data input section 104.

The function of browsing through documents existing on the computer network 100, or the document browsing function of retrieving and displaying any document will be explained briefly. The document browsing function is the basic function found in the widely used WWW browsers. It functions as follows. When receiving the user's access request to browse a specific document, the document browsing function accesses a resource on the computer network via the network input/output section 101 according to the request and requests the data of the specified document. In response to the request, the computer network 100 transmits the data. When the data is received by the network input/output section 101, the data is transferred via the control section 105 to the data output section 103, which presents the data to the data.

Such a document browsing function and the function of the data output section 103 may be realized by making use of suitable functions that a browser (not shown) has. The document browse support system does not necessarily require the network input/output function of the network input/output section 101, but may make use of the network input/output function of the browser.

The first embodiment is characterized by taking in the data as outlined in FIG. 2 (hereinafter, referred to as the plug-in package data) from the user data input section 104 or network input/output section 101 and browsing through documents. The plug-in package includes at least expression patterns and a plurality of pattern action units 201, 202, 203, which are data items describing related information associated with the output information to acquire the pieces of output information corresponding to the patterns. The output information is the information outputted from the data output section 103 in browsing through documents, such as the information to be displayed.

Each of the pattern action units 201, 202, 203 is composed of three parts: a pattern descriptive section, an action descriptive section, and a status descriptive section. The details of the respective parts will be explained later. In the package data descriptive section 200 in the plug-in package, such pieces of information as package title, date, location, and personal information are written.

Figure 3:
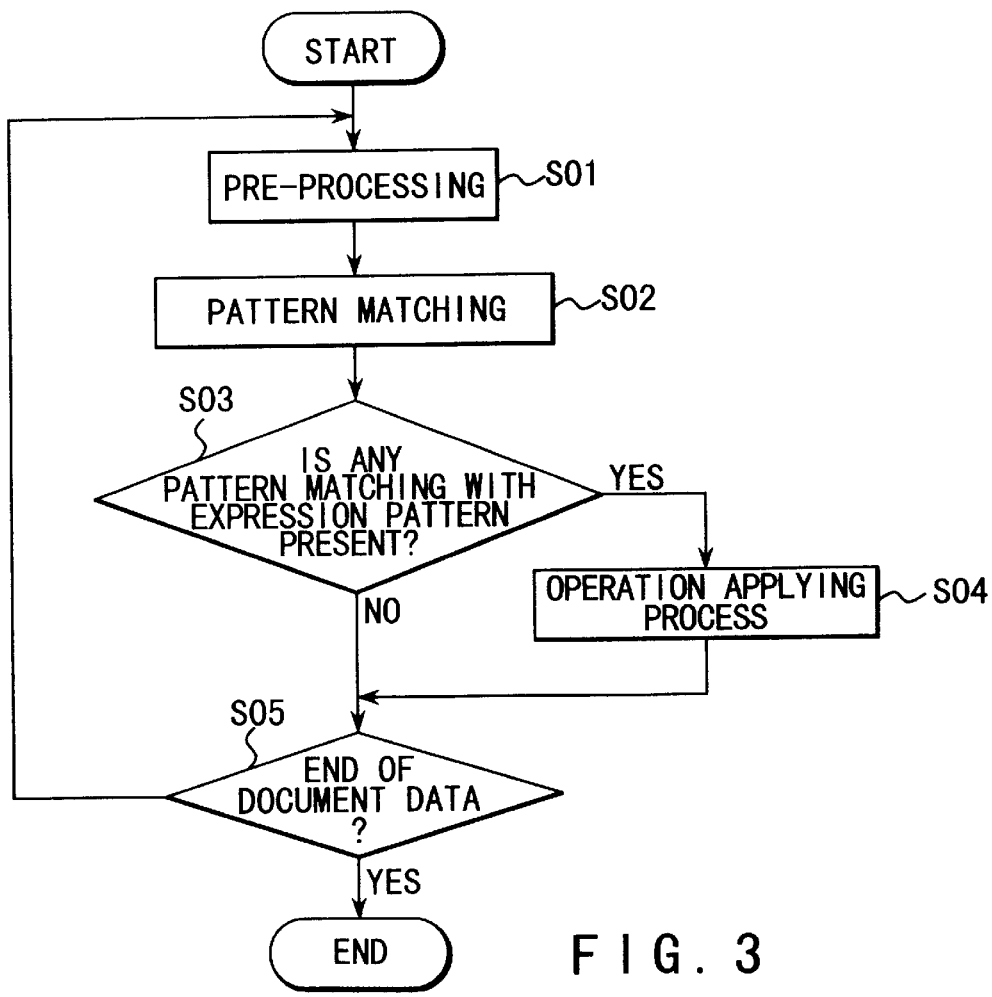
FIG. 3 is a flowchart of the algorithm for referring to and executing the pattern action unit of FIG. 2.

The control section 105 refers to the pattern action units 201, 202, 203 and executes these units according to the flowchart materializing the algorithm associated with the document browse support system of the present invention shown in FIG. 3.

Figure 4:
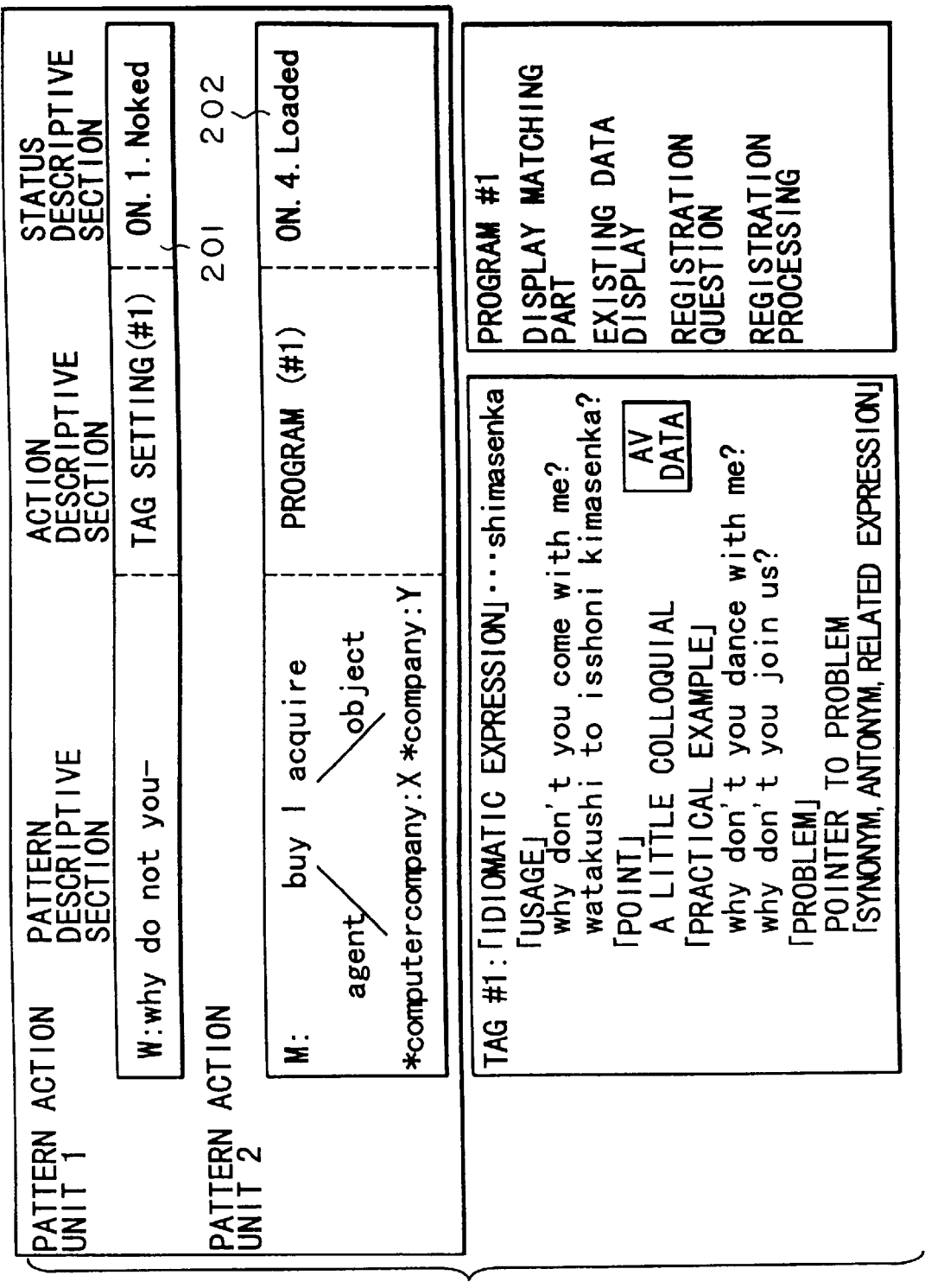
FIG. 4 shows a concrete example of the two action units of FIG. 2.

The algorithm of FIG. 3 will be described by reference to FIG. 4 showing a concrete example of two pattern action units 1 and 2 of FIG. 2. The algorithm of FIG. 3 is applied to a document (hereinafter, an input document) that is acquired from the computer network 100 and is to be browsed under the direction of the user.

In the pre-processing at step S01, the pre-processing for a matching process of the input document is carried out. The pre-processing differs according to the application of the document browse support system. In the first embodiment, the pre-processing includes a dictionary-consulting process, a morpheme analyzing process, and a sentence analyzing process. These processes are based on known techniques applied to a natural language processing system, such as a machine translation system, so the details of the processes will not be given here. With the pre-processing, the word standard form (e.g., go (verb, progressive form) for "going" in the original text) in the input document and the relation between words (e.g., the construction/semantic relation obtained for the original text "I play tennis" as follows: "I" is the subject (the subjective case) of "play" and "tennis" is an object word (the objective case) of "play") are obtained.

In pattern matching at step S02, the expression pattern written in the pattern descriptive sections of each of the pattern action units 1, 2 of FIG. 4 is matched with the expression pattern in the input document and the expression pattern pre-processed at step S01. Namely, the expression pattern in the input document is sensed by reference to the pre-processed expression pattern.

For example, in the pattern descriptive section of the pattern action unit 1 of FIG. 4, the expression pattern "Why do not you - - -" is written. For this pattern, the identifier "W:" specifies the word-level matching. The pattern is subjected to the matching process performed on a string of words whose morpheme has been analyzed in the pre-processing at step S01.

In this case, because the words in the input document have been standardized in the pre-processing at step S01, matching can be done even when an expression in the input document has words including an upper-case letter, such as "Why don't you dance with me?" ("Why" in this case). Since the inflection and conjugation have also been standardized, matching can be done. In the matching descriptive section, general matching descriptions, such as wild cards, are possible.

Because in the pattern descriptive section of the pattern action unit 2 of FIG. 4, the identifier "M:" specifies that the pattern is to be used for semantic analysis, the pattern is matched with the semantic expression for the input document (the semantic analysis tree not shown in this case) obtained in the pre-processing at step S01. "ComputerCompany:X" in the pattern descriptive section means that it is a word whose semantic category is "computer maker" and that the word is determined to be "X" to enable a later-explained program to refer to it. For the semantic category, an existing conceptual system, a thesaurus (not shown), may be used. Furthermore, "buy|acquire" in the pattern descriptive section is a description meaning that matching is done with either "buy" or "acquire." Moreover, "agent" and "object" in the pattern descriptive section are relational marks representing the semantic relation between words. The pattern is matched with a part of a sentence including such an expression as "HUL acquires Ratos" or "Ratos was acquired by HUL."

As described above, in the pattern descriptive section of the pattern action unit, the expression pattern in the document subjected to the word standardization and the structural and semantic abstraction is written.

Next, at step S03, a check is made to see if the input document includes any pattern that matches with the expression pattern written in the pattern descriptive section of the pattern action unit in the matching pattern check at step S02. If the input document includes such a pattern, an operation applying process at step S04 will be carried out. The operation applying process performs a process corresponding to the description in the action descriptive section of the pattern action unit.

For example, in the action descriptive section of the pattern action unit 1 of FIG. 4, the action "TAG SETTING (#1)" has been written. This means that the link data to start a program using data item #1 is given to the expression pattern section of the input document matched with the expression pattern written in the pattern descriptive section. This produces the same effect as the link function in an HTML document on the WWW (World Wide Web). As a result, in the example of the pattern action unit 1 of FIG. 4, the character string "Why don't you dance with me?" in the input document is converted into "<Pref:Why don't you/TAG#1>dance with me?," for example. An example of the contents of TAG #1 is shown at the bottom left of FIG. 4.

When <Pref:Why . . . > added with "Ref:" tag is displayed in such a matter that it may be distinguished from the other part at the data output section 103, for example, when it is displayed in a different color, the user can recognize that the part matches with the expression pattern written in the pattern descriptive section. Then, when the user gives an execution instruction from the user data input section 104 by positioning the mouse pointer over the part <Pref:Why . . . > and clicking the mouse button, a specific process is performed on the basis of the data in the action descriptive section of the pattern action unit 1.

In the pattern action unit 2 of FIG. 4, "PROGRAM #1" has been written in the action descriptive section. This means that the action descriptive section is to be processed without waiting for the user's execution instruction. An example of the contents of PROGRAM #1 is shown at the bottom right of FIG. 4.

In the operation applying process at step S04, a process in connection with the status descriptive section in the pattern action unit is also carried out at the same time. In the first field of the status descriptive section, ON/OFF is written. This is for determining whether or not the operation applying process of the pattern action unit itself is performed. If OFF is written, the operation applying process will not be performed even when the expression pattern matches with the expression pattern written in the pattern descriptive section. The user specifies ON/OFF from the user data input section 104 of FIG. 1.

The second field of the status descriptive section stores the frequency of appearance of the expression pattern in the input document and increments the count each time the expression pattern matched with the expression pattern written in the pattern descriptive section appears in the input document. By referring to the contents of the second field, a pattern action unit whose count has exceeded a specific frequency of appearance is turned on. Namely, it is possible to carry out the process written in the action descriptive section only for expression patterns appearing very frequently or perform the process each time a specific frequency of appearance has been reached.

The processes at steps S01 to S04 are repeated until the end of the document data in the input document has been found at step S05.

Next, using an example of a concrete document, the operation of the document browse support system of the first embodiment will be described.

Figure 5:
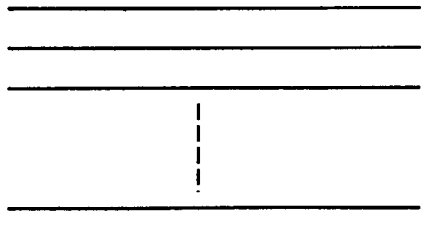
FIG. 5 shows an example of a display screen at the time when a document including hyperlinks to other documents on the network in the first embodiment.

FIG. 5 shows an example of a display screen produced when a document on the computer network 100 including hyperlinks to other documents on the computer network 100 has been taken in as an input document via the network input/output section 101 and displayed at the data output section 103. The underlines indicate the existence of hyperlinks. In the source text of the input document, a hyperlink part includes a tag indicating the hyperlink part and a pointer (not shown) to a document on the computer network 100. When the user moves the cursor to the part having the hyperlink and clicks the mouse button, the corresponding document on the computer network 100 is loaded as an input document into the data storage section 102 via the network input/output section 101 and the control section 105 causes the data output section 103 to display the document.

Figure 6:
FIG. 6 shows an example of a browse screen in the first embodiment.

It is assumed that the document corresponding to the part "New Information Guide" is the document shown in the screen of FIG. 6 (browse screen). The document of FIG. 5 has been already stored in the data storage section 102 as described above and has been displayed at the data output section 103. When the user clicks the part "New Information Guide" on the display screen, the user data input section 104 transfers the click information to the control section 105. Receiving this, the control section 105 takes out the location data on the corresponding document from the data storage section 102 and sends a request to transmit the document data to a specific computer on the computer network 100 via the network input/output section 101. Receiving the transmission request, the requested computer sends the requested document data to the requesting computer.

FIG. 7 shows part of the document data sent from the requested computer to the requesting computer on the computer network 100. That part of the document data is used to produce the browse screen of FIG. 6. The document data is a text with tags such as HTML (HyperText Markup Language). When the document data is inputted to the requesting computer, the tag part and the content part (the contents of the display) are analyzed and the content part is extracted. This process may be realized by existing techniques, such as SGML parsers (Standard Generalized Markup Language parsers).

The content part thus extracted is subjected to the pre-processing at step S01 of FIG. 3. With the pre-processing, the information as shown in FIG. 8 is obtained for the word standard form of the part "Why don't you try new products" as described earlier. For the first word, "1" is the number of word, "why" is the standard form of the input word "Why," WH in "(WH, HeadCap)" is a part of speech, HeadCap is information indicating that the first character has been made capital, and 45–47 is information for maintaining the relation to the word "Why" in the original text. Although not shown, a semantic analysis tree for the sentence is also produced in the pre-processing at step S01.

The expression pattern in the word standard form is subjected to the pattern matching at step S02. In this case, it is judged at step S03 that the expression pattern has matched with the expression pattern written in the pattern descriptive section of the pattern action unit 1 of FIG. 4. As a result, the operation applying process at step 04 converts part of the text with a tag
<HD1:Why don't you try new products!> into
<HD1:<pref:Why don't you/tag #1>try new products!>.

Figure 9:
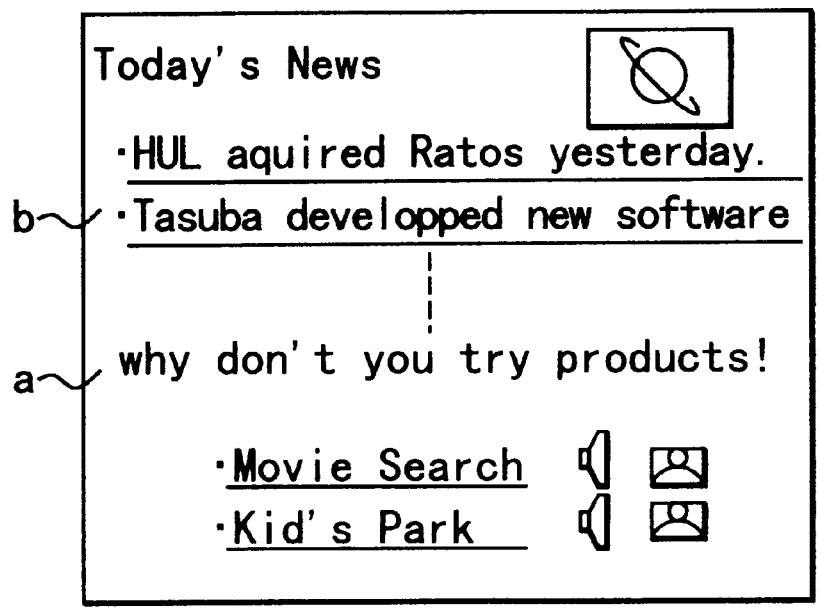
FIG. 9 shows an example of a display screen in the first embodiment.

FIG. 9 shows an example of a display screen after the operation applying process. Because the part a of "Why don't you" is marked with a "pref" tag in the operation applying process, it is displayed in a manner different from the other parts (e.g., in red characters). In addition, the part a of "Why don't you" is related to "tag #1" in the "pref" tag. Accordingly, when the user specifies the execution of the part "Why don't you" from the user data input section 104, the output process is carried out on the basis of "TAG #1" shown at the bottom left of FIG. 4.

Figure 2:
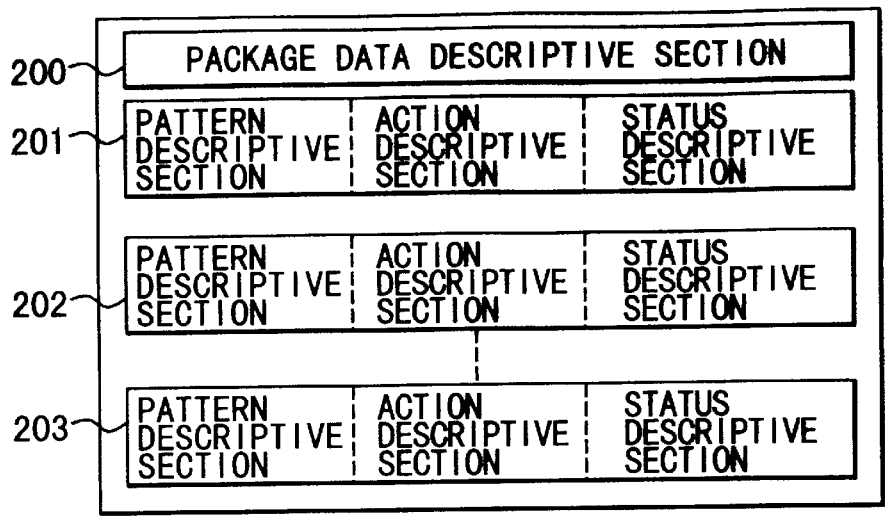
FIG. 2 shows an outline of plug-in package data used in the first embodiment.
Figure 10:
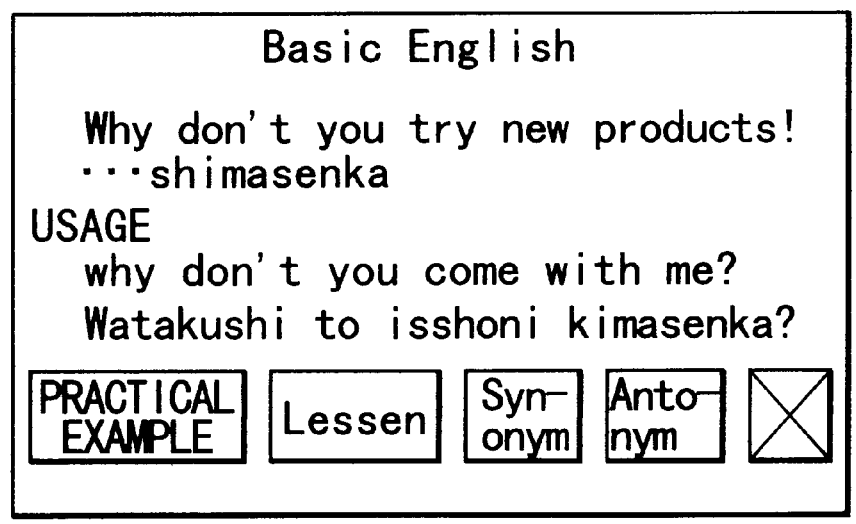
FIG. 10 shows an example of a display screen in the first embodiment.

FIG. 10 shows an example of a display screen at the data output section 103 at the time of the output processing on the basis of "TAG #1." In the figure, "Basic English I" is the package title written in the package descriptive section of FIG. 2. The next part "Why don't you try new products!" is the part taken out of the input document. To make it easier to understand the part, the part "Why don't you" is highlighted which has the same expression pattern as that written in the pattern descriptive section. Under the description, "shimasenka," Japanese for "Why don't you," appears. Still under the Japanese expression, a usage of "Why don't you" previously stored appears together with a translated sentence.

At the bottom of the display screen in the output process of FIG. 10, five buttons appear. "Example" button is linked to an example previously matched (in this case, an illustration including "Why don't you"). Pressing the button causes the example recorded in the part "PRACTICAL EXAMPLE" of FIG. 4 to appear (not shown). "Lesson" button is related to the audio/video data and programs for practicing the expression "Why don't you." The user can practice English conversation by pressing the "Lesson" button. "Synonym" button has the function of presenting related information on similar expressions. "Antonym" button has the function of presenting related information on opposite expressions. "X" button is used to close the display screen.

Figures 11, 12:
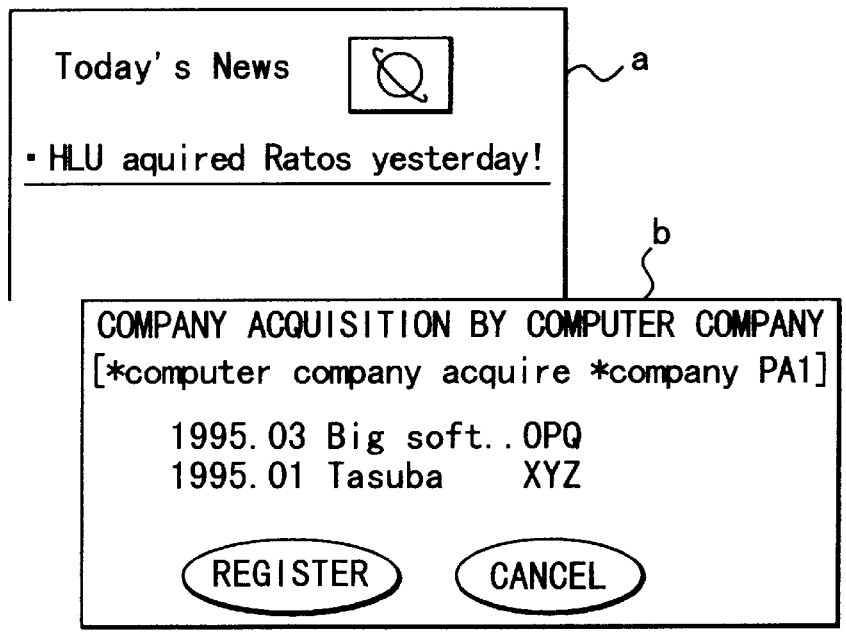
FIG. 11 shows an example of a semantic analysis tree in the first embodiment.
FIG. 12 shows an example of a display screen in the first embodiment.

The pre-processing at step S01 is applied to the content part <ITM:HUL acquired Ratos Yesterday>of FIG. 7 and the word standard form and the semantic analysis tree are produced internally. FIG. 11 shows an example of the semantic analysis tree produced in the pre-processing. Since the dictionary is consulted for words in the input document, various pieces of information are given to the words in the semantic analysis tree. In FIG. 11, the semantic category "*ComputerCompany" is given to "HUL" and the semantic category "*ComputerSoftwareCompany" is given to "Ratos." For the expression pattern written in the pattern descriptive section in the pattern action unit 2 of FIG. 4, matching is successful as described earlier. In this case, the semantic category "*Company" written in the pattern descriptive section is matched with "Ratos." This is because the semantic category "*ComputerSoftwareCompany" given to "Ratos" matches with the semantic category "*Company." The action descriptive section in the pattern action unit 2 has a link to PROGRAM #1. This is outlined at the part of PROGRAM #1 of FIG. 4.

FIG. 12 shows an example of a display screen resulting from the output process at the time when PROGRAM #1 has been started. In FIG. 12, reference symbol "a" indicates the screen shown in FIG. 9 and "b" indicates the screen presented by PROGRAM #1.

FIG. 13 shows a database serving as a source of information which a program, such as PROGRAM #1, accesses. The information indicated by "b" in FIG. 12 is taken out of the database by PROGRAM #1. In the part of PA1 in FIG. 13, the data extracted from the input document by PROGRAM #1 is stored. Although in FIG. 13, only one data item has been written in the part of PA1, more than one data item may be stored. In the part of PA5, the data is stored by PROGRAM #5 (not shown). Although PA5 has a different action from PA1, PROGRAM #1 and PROGRAM #5 are categorized into the common extraction object "COMPANY ACQUISITION BY COMPUTER COMPANY." In the part of "COMPANY ACQUISITION BY COMPUTER COMPANY," a combination of both of the data items in PA1 and PA5 is displayed. PROGRAM #5 is useful in taking out data items from a noun phrase expression, such as "HUL's acquisition of Ratos," and dealing with many expression patterns.

Pressing "REGISTER" button in the screen indicated by "b" of FIG. 12 causes the information currently sensed from the input sentence, that is, the information "HUL, acquire, Ratos, 1995.08," is added to the database. The database may be in a file on the computer or stored in a detachable storage medium.

As described so far, with the first embodiment, the user browsing through documents on the computer network can perform a specific output process on the desired expression pattern appearing in the document. For example, the user can perform the output process of displaying learning data about the English expressions on the page the user is now seeing or storing the learning data. Namely, the user can learn language or acquire information while looking at the information the user wants.

(Second Embodiment)

Hereinafter, a second embodiment in which a document processing system according to the present invention is applied to a document browse support system will be explained.

FIG. 14 shows the configuration of a data retrieval system that the document processing system according to the second embodiment has as a component part or an additional component part. The retrieval system comprises a character string input section 301 with the function of receiving character strings, a document location dictionary section 302 that stores the document location information indicating character strings and the locations of documents on the computer network, an output section 303 that outputs the document location information etc., and a control section 304 that controls these sections.

FIG. 15 shows an example of the contents of the document location dictionary section 202. The document location dictionary section 202 is a table that lists "headlines" consisting of linguistic expressions (character strings) obtained by retrieving a WWW document on the Internet and the "document location information" indicating the locations of documents to specify WWW documents using the linguistic expressions in such a manner that the headlines correspond to the pieces of the location information. Pieces of information constituting the document location dictionary section 302 can be collected by a robot that collects WWW documents. In FIG. 15, a headline is a character string including words, composite words, phrases, and other arbitrary character strings. In the second embodiment, the part of a reference character string is taken out of the WWW document and is used as a headline. For instance, from the hyperlink form in HTML <A HREF="http://www.tasuba.com/product/dynabook.html">DynaBook</A> "DynaBook" is taken out as a headline and the part "http://www.tasuba.com/product/dynabook.html" is taken out as the document location information indicating the location of the WWW document.

In the document location dictionary section 302, the headline is also related to the following pieces of information: REFERENCE, UPDATE TIME, and FREQUENCY OF UPDATE. "REFERENCE" is the number of links created in the WWW document. "UPDATE TIME" is the time at which the WWW document was last updated. In the example, it is the date. "FREQUENCY OF UPDATE" is, for example, the frequency of update per week in the past three months. These pieces of information can be collected from all of the WWW pages in an area on a specific network or all over the world. The document location dictionary section 302 of FIG. 15 is constructed as described above in the second embodiment.

The control section 304 carries out the processes shown in the flowchart of FIG. 16. First, the character string input section 301 takes out the inputted character string (step Si1) and searches the document location dictionary section 302 for the inputted character string (step S12). As a result of the search, if a headline matching with the inputted character string exists in the document location dictionary section 302, the control section will cause the output section 303 to output the contents of the dictionary, including DOCUMENT LOCATION INFORMATION, REFERENCE, UPDATE TIME, and FREQUENCY OF UPDATE. If no headline exists, the control section will cause the output section 303 to output a data item to that effect (step S13). Accordingly, when a character string is entered from the character string input section 301, if a document including a hyperlink formed of the character string exists on the computer network, a document at the hyperlink destination can be obtained.

Even when the original document on a computer has no hyperlink, the document processing system of the second embodiment can offer new information on a link to the document, making use of the aforementioned function. Hereinafter, how to realize the offering will be explained.

A first method uses basically the same approach as the method explained in the first embodiment. With the first embodiment, the pattern action unit 1 of FIG. 4 is used to cause the expression pattern "Why do not you" in the input document matched with the expression pattern written in the pattern descriptive section to correspond to a hyperlink data item as a related data item corresponding to the expression pattern. This makes the expression pattern in the document look different from the rest on the screen as shown by "a" of FIG. 9. When the user specifies the part of "Why don't you" from the user data input section 104, the output information as shown in FIG. 10 is displayed at the data output section 13.

With this approach, as shown in FIG. 15, it is possible to cause hyperlinks (document location information) as related information, for example http://www.tasuba.co.jp/welcome.html http://www.tasuba.co.jp/ http://www.abc.com/information/ts.html 2 4/12/95 0.003 to correspond to a word existing in the headline in the data in the document location dictionary section 302, such as a character string (corresponding to the expression pattern written in the pattern descriptive section in the first embodiment) "Tasuba". In this case, the user may be required to select one from the presented hyperlinks.

FIG. 17 shows an example of a display screen that presents the related information to the user. In the figure, "3/3" is the number of WWW documents and the number of documents displayed among the WWW documents. Although FIG. 17 shows all the pieces of information shown in FIG. 15, the number of items displayed may be limited or the order in which the items are displayed may be changed using "REFERENCE," "UPDATE TIME," and "FREQUENCY OF UPDATE" as parameters. In the case of FIG. 17, items are arranged in descending order of the frequency of reference. Furthermore, the number of displays may be limited to a specific value. Representations in the lower part of the screen can be referred to by using the scroll bar. Although not shown here, part of the WWW document (e.g., a character string in the headline) may be taken out beforehand and displayed as needed.

When the original document has a hyperlink already created to "Tasuba," the hyperlink is combined to a new hyperlink forced to correspond to the document as described earlier and the combination is shown. The link created in the original document (referred to as the original link and a hyperlink not existing in the original document is called a second-order link to distinguish this from the original one) is more important, so it is placed at the head of the representation.

FIG. 18 shows how to display the hyperlinks when http://www.abc.com/information/ts.html is the original hyperlink. In the figure, "*" is attached to the original link to make it appear different from the rest, emphasizing that it is the original link. Since the original link is important, it may be displayed all the time.

In this way, when taking in a WWW document on the computer network, the user can easily retrieve and display a hyperlink not included in the original document and display it and browse through documents, making use of the hyperlink.

With the second embodiment, rewriting the contents of the document taken in by the document browser enables the hyperlink information not included in the original document to be retrieved, displayed, and used. The above-described method is not the only realization method. For instance, the same effect can be produced without changing the contents of the original document. To do this, the component part that provides a browse display has only to manage two or more pieces of information, information on the original document and information on a document including hyperlink data items.

(Third Embodiment)

A third embodiment of the present invention relates to a document processing system capable of creating a computer-network-oriented document easily.

When a computer-network-oriented document such as a WWW HTML document is created, hyperlinks to other documents on the network are usually created. The work generally involves entering the document location information (referred to as Uniform Resource Locator (URL) in the WWW) indicating the location of a document to which the user wants to creates a link.

A lot of skill and time, however, are needed for the user to be able to enter the document location information properly and quickly and create hyperlinks to other documents.

With the third embodiment, a document processing system for creating documents with hyperlinks is provided with the function of temporarily giving second-order links explained in the second embodiment and the function of determining only the second-order link specified by the document creator to be the original link. It is assumed that a character string the creator wants to give a hyperlink, for example, the word "Tasuba" exists in the document being created. When the document creator specifies the character string (the area of the specified character string is called a hot spot) by making use of existing character string specifying techniques, such as dragging an icon with the mouse, this makes the character string a headline representing a hyperlink to another document. Before the specification of the headline, a check may be made to see if the document currently being created includes the expression pattern corresponding to either all of or part of the headline (expression pattern) stored in the pattern descriptive section of the document location dictionary section 302; on the basis of the check result, specific character strings (headline candidates) in the document currently being created may be displayed in such a manner that they are distinguished from the other character strings to allow the user to easily specify the character string for a headline on the basis of what has been displayed. It goes without saying that the user may directly enter a character string indicating a headline.

The hyperlink that can be set for the character string can be shown to the user in the form shown in FIG. 17 as in the second embodiment. By specifying the desired one of the hyperlink candidates using the input means, such as a mouse, the user can select the hyperlink information to be set. The setting of the hyperlink information in a specific hyperlink data form, such as a markup language, can be realized using known techniques. This enables the user to select and give hyperlinks to the user-created document by reference to the hyperlinks set in other documents.

As explained so far, with the present invention, at least an expression pattern in the document and the data describing related information associated with the output information to obtain the output information corresponding to the expression pattern are inputted. The expression pattern in the document on the computer network is sensed by reference to the expression pattern in the data. The output information corresponding to the sensed expression pattern is created from the document on the computer network and is outputted. This enables a person other than the document creator to give related information to a document to be browsed. Consequently, the user browsing through documents on the computer network can produce a specific output for the desired expression pattern appearing in the document. Specifically, for example, the output process of presenting the learning data on English expressions on the page the user is now seeing or storing the learning data can be performed, which enables the user to learn or acquire information while looking at the information the user wants.

Furthermore, at least the data describing the expression pattern in the document and the document location information indicating the location of the document including the expression pattern on the computer network in such a manner that the expression pattern corresponds to the document location information is inputted. The expression pattern in the document on the computer network is sensed by reference to the expression pattern in the data. The document location information corresponding to the sensed expression pattern is retrieved from the inputted data and is displayed. This makes it possible to cause the hyperlink to correspond to the document and output it even when the document to be browsed on the computer network has no hyperlink, document location information.

Still furthermore, a character string is stored in such a manner that it is caused to correspond to the document location information indicating the location of the document including the character string on the computer network. The document location information is retrieved on the basis of the inputted character string and is displayed. This makes it possible to retrieve the hyperlink information created in a document by anther person, display it, and use it as document location information, when a document including hyperlinks is created.

The present invention is not limited to the above embodiments, but may be applied to any language, such as Japanese or French. Specifically, the present invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A document browse support system comprising:

a pattern action unit containing a pattern description section in which an expression pattern is written, and an action description section in which an action corresponding to the expression pattern is written;

a browser in which contents of a document are inputted from a network;

retrieval means for retrieving the expression pattern written in the pattern description section of the pattern action unit, said expression pattern being concerned in a contents of the document inputted to the browser; and execution means for executing a specific program on the basis of a description in the action description section corresponding to the expression pattern retrieved by the retrieval means, wherein the action description section contains a program number associated with the expression pattern, and the execution means starts the specific program identified with the program number.

2. The system according to claim 1, further comprising preprocess means for carrying out natural language processing including a dictionary consulting process, morpheme analyzing and sentence analyzing, on the document inputted to the browser, wherein the retrieval means retrieves the expression pattern on the basis of a preprocess means.

3. The system according to claim 1, wherein the specific program is a program for performing database processing on a predetermined database for storing lesson data.

4. The system according to claim 1, wherein said network is a World Wide Web of an Internet and said document is a hypertext using hypertext markup language.

5. A computer-readable memory having program code means embodied for supporting a document browsing system for browsing through documents on a network by a browser using a pattern action unit containing a pattern description section in which an expression pattern is written and an action description section in which an action corresponding to the expression pattern is written, comprising:

first instruction means for causing a computer to retrieve the expression pattern written in the pattern description section of the pattern action unit, from the document inputted by the browser; and second instruction means for causing a computer to execute a specific program on the basis of a description in the action description section, corresponding to the expression pattern retrieved by the first instruction means, wherein the action description section contains a program number associated with the expression pattern, and the second instruction means starts the specific program identified with the program number.

\* \* \* \* \*